US006460945B2

United States Patent
Takeno et al.

(10) Patent No.: US 6,460,945 B2
(45) Date of Patent: Oct. 8, 2002

(54) ENDLESS TRACK AND A MANUFACTURING METHOD THEREOF

(75) Inventors: Hiroyuki Takeno, Hiratsuka; Masahiro Nakajima, Tokyo; Kiyokazu Niwa, Chigasaki; Makoto Takagi, Fujisawa; Hirokatsu Niitsu, Kanagawa-ken; Isao Yoshida; Akihiro Koishi, both of Chigasaki, all of (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/813,815

(22) Filed: Mar. 22, 2001

(65) Prior Publication Data

US 2001/0026099 A1 Oct. 4, 2001

(30) Foreign Application Priority Data

| Mar. 22, 2000 | (JP) | 2000-079997 |
| Jun. 9, 2000 | (JP) | 2000-173699 |
| Feb. 20, 2001 | (JP) | 2001-042920 |

(51) Int. Cl.[7] ............................................. B62D 55/24
(52) U.S. Cl. ..................................... 305/167; 305/165
(58) Field of Search ............................ 305/157, 164, 305/167, 170, 177, 180, 185, 51, 200, 201, 196, 197, 198, 191, 202, 203, 204, 60

(56) References Cited

U.S. PATENT DOCUMENTS

| 4,452,495 A | * | 6/1984 | Orlandea ................. 305/167 |
| 5,630,657 A | * | 5/1997 | Kumano et al. .......... 305/180 |
| 5,988,776 A | * | 11/1999 | Zurn ....................... 305/167 |
| 6,080,493 A | * | 6/2000 | Kent ....................... 305/197 |
| 6,217,135 B1 | * | 4/2001 | Spies et al. ............... 305/191 |
| 6,299,265 B1 | * | 10/2001 | Hoffart .................... 305/191 |

* cited by examiner

Primary Examiner—S. Joseph Morano
Assistant Examiner—Long Bao Nguyen
(74) Attorney, Agent, or Firm—Pillsbury Winthrop LLP

(57) ABSTRACT

An endless track includes an iron link belt, a continuous pad, and a connecting device. The iron link belt includes a link unit assembly constructed of a plurality of link units connected to each other. Each link unit includes a pair of links. The iron link belt may include a plate welded to the pair of links and extending perpendicularly to a direction in which the link unit assembly extends. The continuous pad includes the same number of core metal plates as that of the link units, and a single rubber belt covering and being vulcanization-adhered to a ground opposing surface of each of the core metal plates. The rubber belt extends continuously over all of the core metal plates. The rubber belt may include a small thickness portion positioned between two adjacent core metal plates. The connecting device connects the iron link belt and the continuous pad.

16 Claims, 9 Drawing Sheets

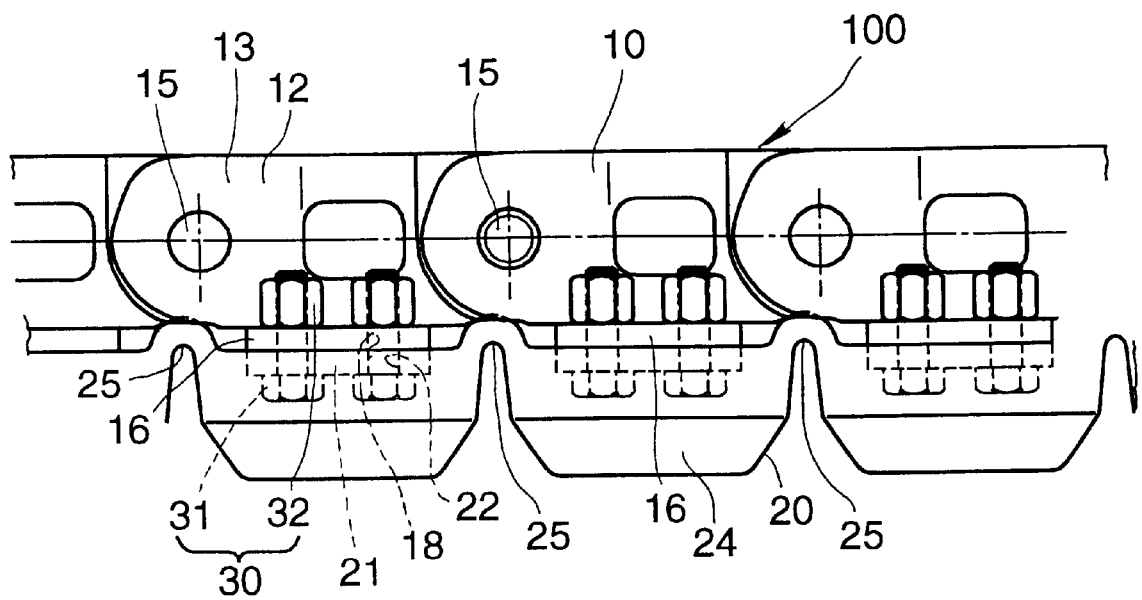
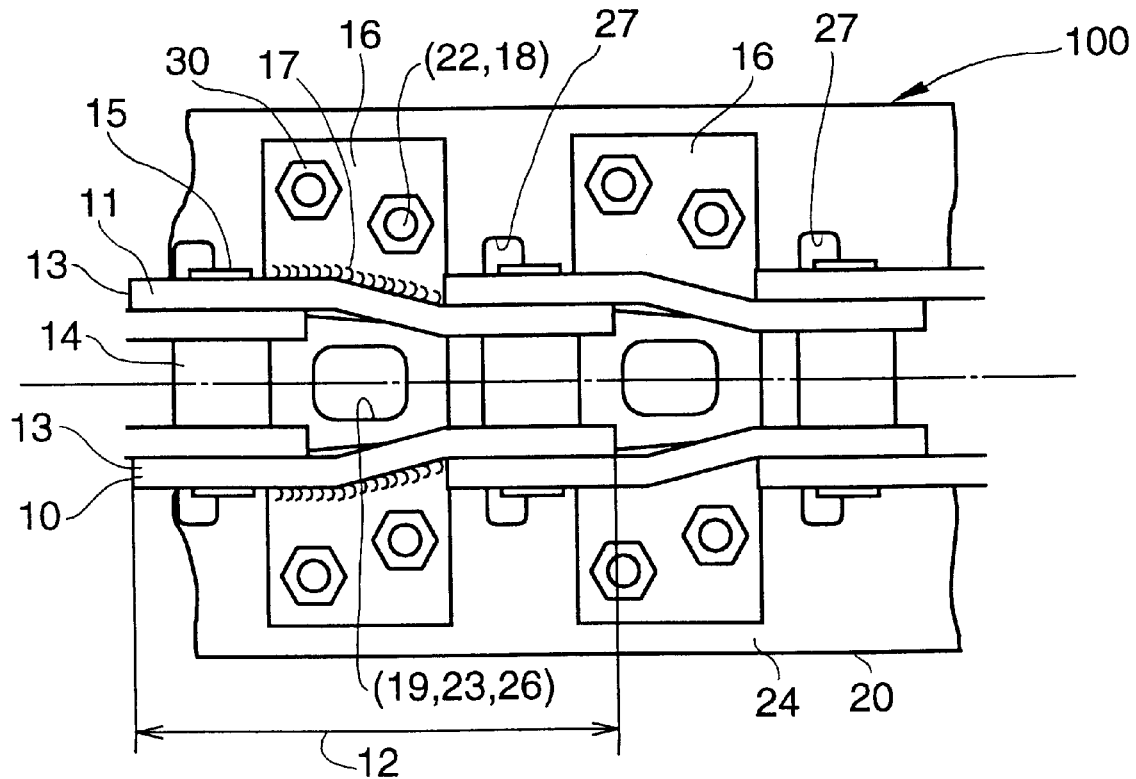

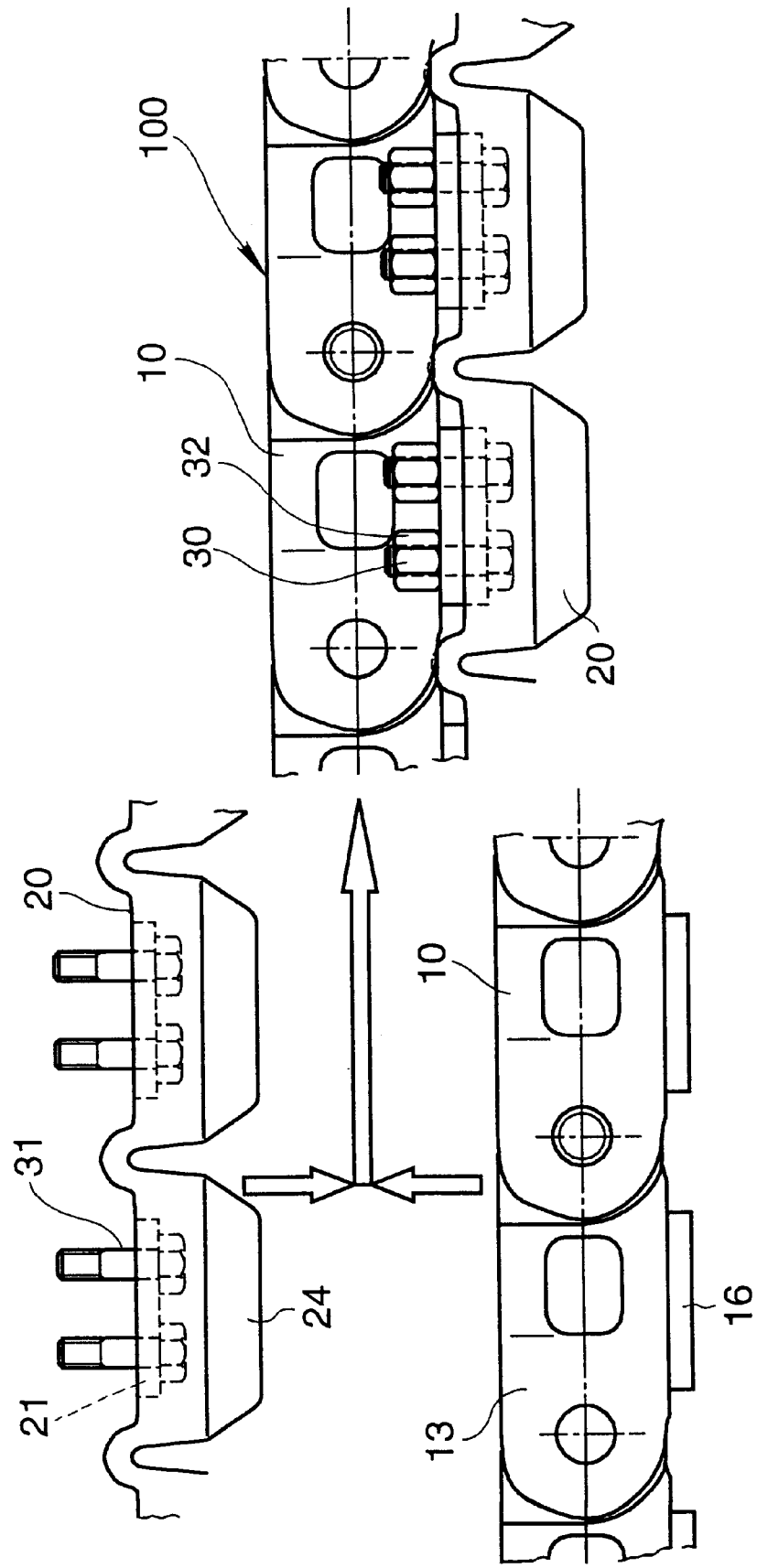

ENDLESS TRACK AND A MANUFACTURING METHOD THEREOF

This application is based on and claims priority from Japanese Patent Application Nos. 2000-79997, 2000-173699 and 2001-42920 filed on Mar. 22, 2000, Jun. 9, 2000 and Feb. 20, 2001, the contents of which are incorporated herein by reference.

BACKGROUND OF THE INVENTION

1. Field of the Invention

The present invention relates to an endless track of the type having a ground opposing surface made from rubber and a manufacturing method thereof.

2. Description of Related Art

Various types of endless tracks used for construction vehicles are known, some of which include a ground opposing surface made from rubber for protecting road surfaces.

Such conventional endless tracks of the type having a ground opposing surface made from rubber are grouped into the following three categories:

The first category of the conventional endless track includes an iron link belt 1, an iron shoe 2 and a rubber pad (A-Type) 3, as illustrated in FIG. 14. The iron link belt 1 is provided with the iron shoe 2 which is formed independently of the iron link belt 1. Each iron shoe 2 is provided with the rubber pad (A-Type) 3 including an iron plate 3a and a rubber material 3b, which is adhered to the iron plate 3a through a vulcanization process.

The second category of the conventional endless track includes an iron link belt 1 and a rubber pad (B-Type) 4, as illustrated in FIG. 15. The iron link belt 1 includes a pair of links, to which a plate 4c is welded. The plate 4c is fastened to the rubber pad (B-Type) by a bolt or the like. The rubber pad (B-Type) includes a core metal plate 4a, and a rubber material 4b, which is adhered to the core metal plate 4a through a vulcanization process. The rubber pad (B-type) is directly fixed to the iron link belt 1 without employing an iron shoe. Therefore, the endless track of the second type does not include an iron shoe.

The third category of the conventional endless track includes a rubber crawler 5, as illustrated in FIG. 16. A plurality of iron core plates 5a are embedded in a single rubber belt 5, and the rubber 5b of the rubber belt 5 is adhered to the iron core plates 5a through a vulcanization process, while exposing a part of each iron core plate 5a. The rubber belt 5b extends endlessly. The endless track engages a sprocket at an exposed portion of each iron core plate 5a. Therefore, the endless track of the third category includes neither an iron link belt nor an iron shoe.

Hereinafter, the first category of the conventional endless track will be referred to hereafter as a rubber pad type A, the second category of the endless track will be referred to hereafter as a rubber pad type B, and the third category of the endless track will be referred to hereafter as a rubber crawler type.

The following problems exist in the conventional endless tracks of the type having the ground opposing surface made from rubber.

With the conventional endless track of the rubber pad type A (the first category), rubber needs to be vulcanization-adhered to the iron plate per each of the rubber pads, which requires much time and work, resulting in low productivity.

Further, the conventional endless track of the rubber pad type A requires a large number of members. Thus, the cost is high.

Similarly, with the conventional endless track of the rubber pad type B (the second category), rubber needs to be vulcanization-adhered to the core plate per each of the rubber pads, which requires much time and work, resulting in low productivity.

Although the number of members required for the rubber pad type B is smaller than that of the rubber pad type A because no shoes are included in the rubber pad type B, the rigidity is required all over the rubber pad, so that the manufacturing cost is almost the same as that of the conventional endless track of rubber pad type A.

With the conventional endless track of the rubber crawler type (the third category), the number of the members and the cost are reduced compared with those of the rubber pad type A and the rubber pad type B. However, because a tensile force is borne by the rubber belt only, the life of the rubber belt is relatively short. As a result, breakage of the rubber belt and derailment of the rubber belt are likely to occur during operation.

SUMMARY OF THE INVENTION

An object of the present invention is to provide an endless track of the type having a ground opposing surface made from rubber and a manufacturing method thereof, whereby the productivity in vulcanization-forming may be improved, the number of members may be reduced, and the durability may be improved.

The above object can be performed by an endless track and a manufacturing method according to the present invention, as follows:

An endless track includes an iron link belt, a continuous pad and a connecting device. The iron link belt includes a link unit assembly constructed of a plurality of link units connected to each other. Each link unit includes a pair of links.

The continuous pad includes the same number of core metal plates as that of the plurality of link units and a single rubber belt. Each of the core metal plates is fixed to each of the plurality of link units. The rubber belt covers and is vulcanization-adhered to a ground opposing surface of each of the core metal plates. The rubber belt extends continuously over all of the core metal plates.

The connecting device connects the iron link belt and the continuous pad at the link units and the core metal plates.

Each of the pair of links comprises at least one of a bent plate link and a forged link.

The connecting device includes at least one of a bolt-and-nut and a welding.

The connecting device includes the bolt-and-nut, and the bolt-and-nut is welded to the core metal plate and is covered with the rubber of the rubber belt.

Preferably, the iron link belt includes the same number of plates as that of the plurality of link units. Each of the plates is welded to the pair of links of each of the plurality of link units of the link unit assembly and extends perpendicularly to a direction in which the link unit assembly extends. Each of the core metal plates of the continuous pad is fixed to each of the plates of the iron link belt. The rubber belt of the continuous pad includes a small thickness portion between two adjacent core metal plates of the core metal plates. The link belt and the continuous pad are connected to each other by the connecting device at the plates and the core metal plates.

Preferably, each of the core metal plates of the continuous pad extends perpendicularly to a direction in which the link unit assembly extends and is directly welded to the pair of links of each of the plurality of link units of the link unit assembly.

The rubber belt of the continuous pad includes a small thickness portion positioned between two adjacent core metal plates of the core metal plates.

Preferably, the iron link belt includes the same number of plates as that of the plurality of link units. Each of the plates is welded to the pair of links of each of the plurality of link units of the link unit assembly and extends perpendicularly to a direction in which the link unit assembly extends. Each of the core metal plates of the continuous pad is fixed to each of the plates of the iron link belt. The rubber belt of the continuous pad includes a normal thickness portion positioned between two adjacent core metal plates of the core metal plates. The link belt and the continuous pad are connected to each other by the connecting device at the plates and the core metal plates.

Preferably, each of the core metal plates of the continuous pad extends perpendicularly to a direction in which the link unit assembly extends and is directly welded to the pair of links of each of the plurality of link units of the link unit assembly. The rubber belt of the continuous pad includes a normal thickness portion positioned between two adjacent core metal plates of the core metal plates.

A method for manufacturing an endless track includes: (a) connecting a plurality of link units each having a pair of links thereby manufacturing a link unit assembly of an iron link unit; and (b) providing the same number of core metal plates as that of the plurality of link units of the iron link belt and forming a single rubber belt continuously extending over all of the core metal plates such that the single rubber belt covers and is vulcanization-adhered to a ground opposing surface of each of the core metal plates, thereby manufacturing a continuous pad.

Each link of the pair of links is manufactured through at least one of a bending and forging process.

Preferably, during the manufacturing of the iron link belt, a plate extending perpendicularly to a direction in which the link unit assembly extends is welded to the pair of links of each of the plurality of link units of the link unit assembly. During the manufacturing of the continuous pad, before the core metal plates are fixed to the plurality of link units, a small thickness portion is formed between two adjacent core metal plates of the core metal plates when the rubber belt is vulcanization-formed. After manufacturing the continuous pad, the iron link belt and the continuous pad are connected to each other by a connecting device at the plates and the core metal plates.

Preferably, the connecting device includes a bolt and a nut, and before vulcanization-forming of the rubber belt, at least one of the bolt and the nut is welded to each of the core metal plate. During vulcanization-forming of the rubber belt, at least one of the bolt and the nut is covered with a rubber of the rubber belt.

Preferably, each of the core metal plates extending perpendicularly to a direction in which the link unit assembly extends is directly welded to the pair of links of each of the plurality of link units of the link unit assembly of the iron link belt. During manufacturing of the continuous pad, when the rubber belt is vulcanization-formed, a small thickness portion is formed to the rubber belt between two adjacent core metal plates of the core metal plates.

Preferably, during manufacturing of the iron link belt, a plate extending perpendicularly to a direction in which the link unit assembly is welded to the pair of links of each of the plurality of link units of the link unit assembly. Before manufacturing the continuous pad, each of the core metal plates is fixed to the plate of each of the link units of the iron link belt. During manufacturing of the continuous pad, the rubber belt is vulcanization-formed such that the rubber belt covers each of the core metal plates and such that a normal thickness portion is formed to the rubber belt between two adjacent core metal plates of the core metal plates when the rubber belt is vulcanization-formed.

Preferably, each of the core metal plates extending perpendicularly to a direction in which the link unit assembly extends is directly welded to the pair of links of each of the plurality of link units of the link unit assembly of the iron link belt. During manufacturing of the continuous pad, a normal thickness portion is formed to the rubber belt between two adjacent core metal plates of the core metal plates when the rubber belt is vulcanization-formed.

Preferably, the method further includes dividing the rubber belt between two adjacent core metal plates of the core metal plates among a plurality of separate pads.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which:

FIG. 1 is a partial side view of an endless track, according to a first embodiment of the present invention;

FIG. 2 is a partial plan view of the endless track, as viewed from a side opposite to a ground opposing surface, according to the first embodiment of the present invention;

FIG. 3 is a partial side view illustrating a manufacturing method of the endless track shown in a manufacturing order, according to the first embodiment of the present invention;

DETAILED DESCRIPTION OF THE PREFERRED EMBODIMENTS

The first embodiment of the present invention is directed to an endless track having a plate and a small thickness portion, and to a manufacturing method thereof, as illustrated in FIGS. 1–3.

Each of the second, third and fourth embodiments of the present invention is directed to an endless track and a manufacturing method partially changed from the first embodiment, respectively.

Figure 4:
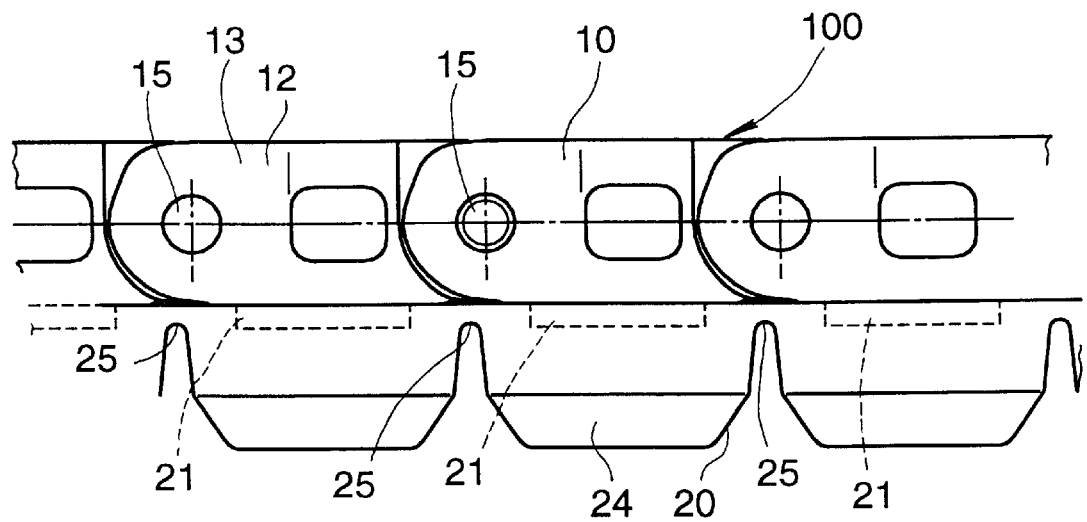
FIG. 4 is a partial side view of an endless track, according to a second embodiment of the present invention.
Figure 5:
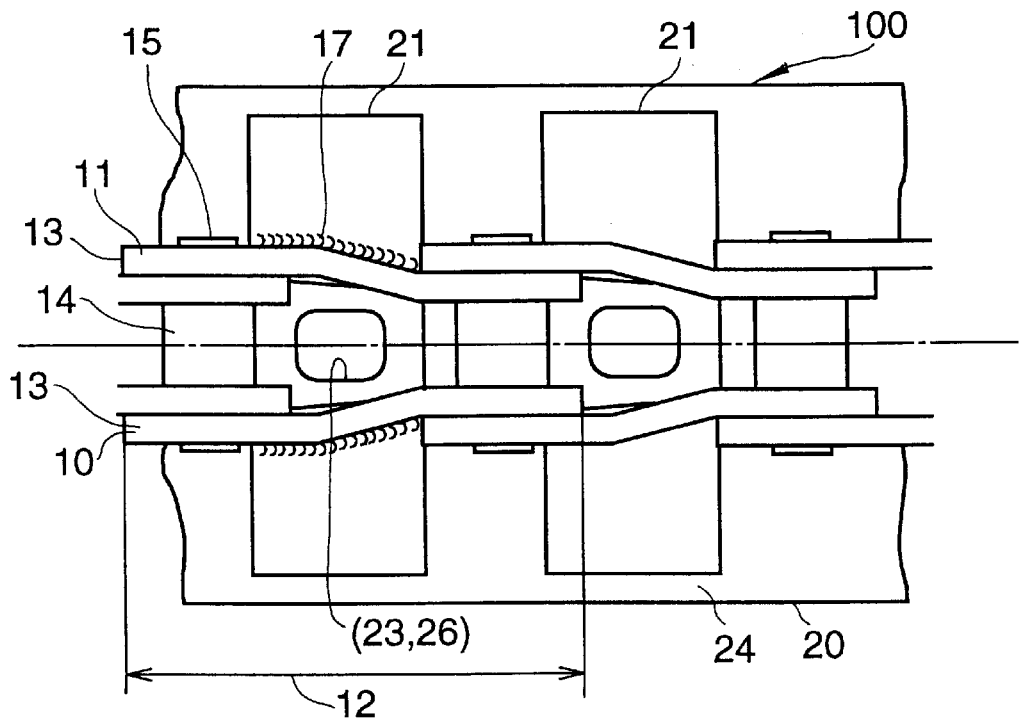
FIG. 5 is a partial plan view of the endless track, as viewed from a side opposite to a ground opposing surface, according to the second embodiment of the present invention.
Figure 6:
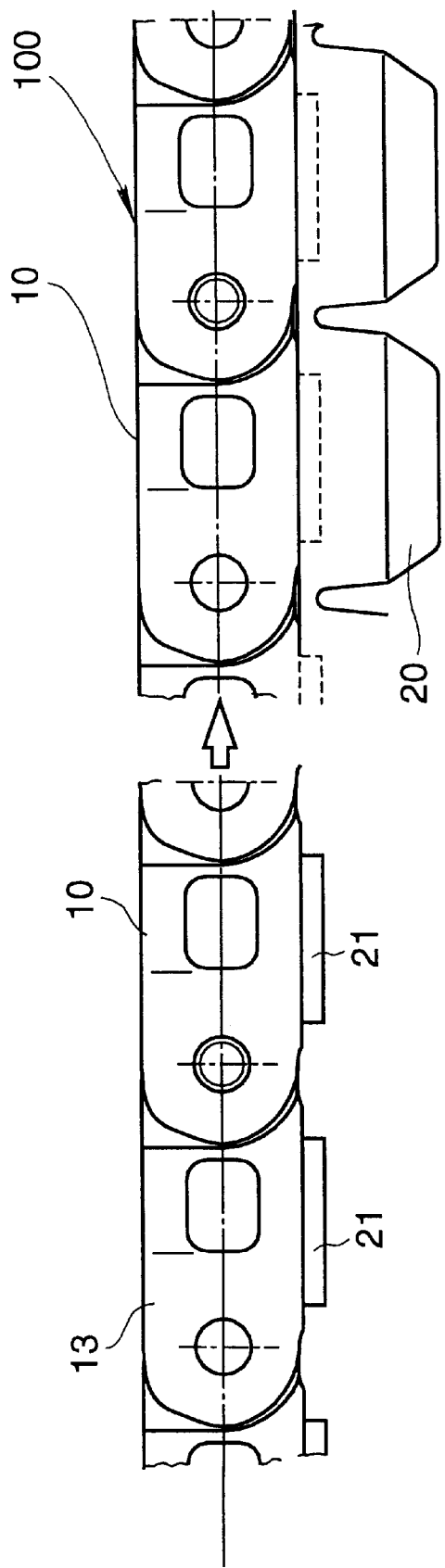
FIG. 6 is a partial side view illustrating a manufacturing method of the endless track shown in a manufacturing order, according to the second embodiment of the present invention.

The second embodiment of the present invention is directed to an endless track having no plate and having a small thickness portion, and to a manufacturing method thereof, as illustrated in FIGS. 4–6.

Figure 7:
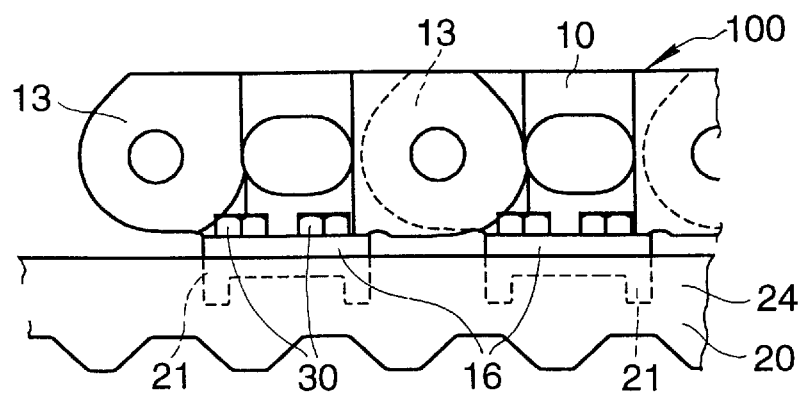
FIG. 7 is a partial side view of an endless track, according to a third embodiment of the present invention.
Figure 8:
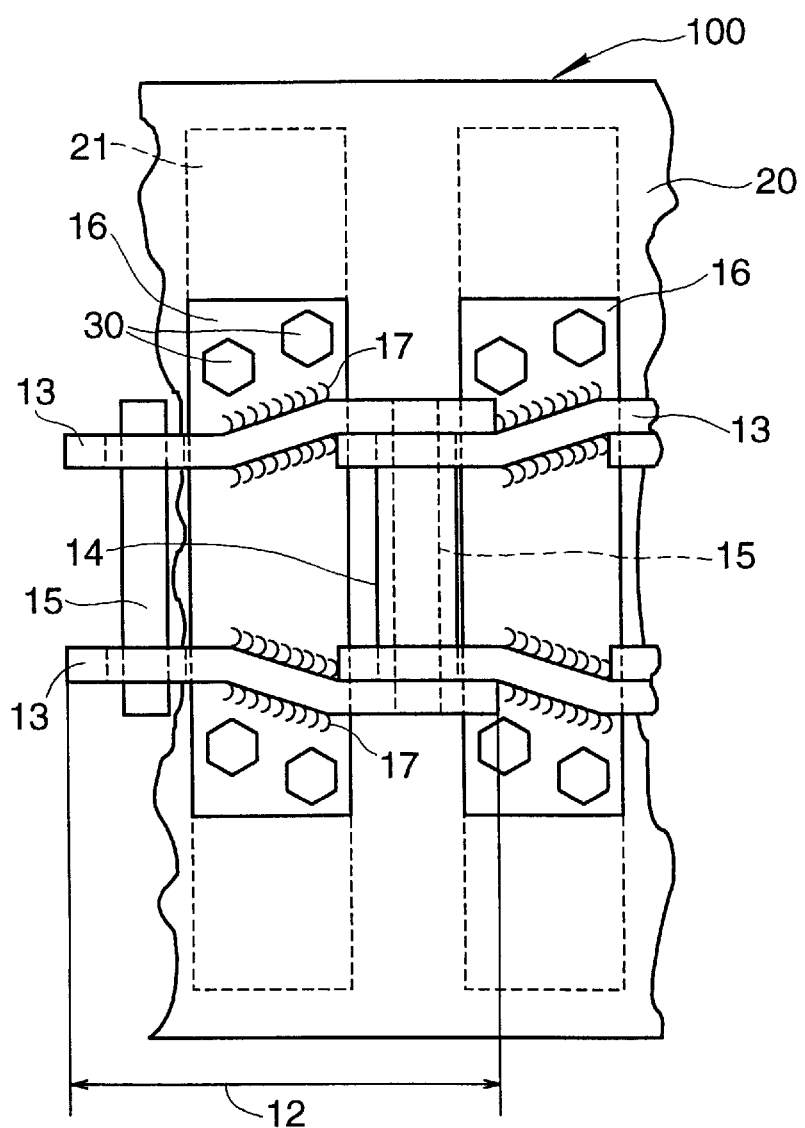
FIG. 8 is a partial plan view of the endless track, as viewed from a side opposite to a ground opposing surface, according to the third embodiment of the present invention.
Figure 9:
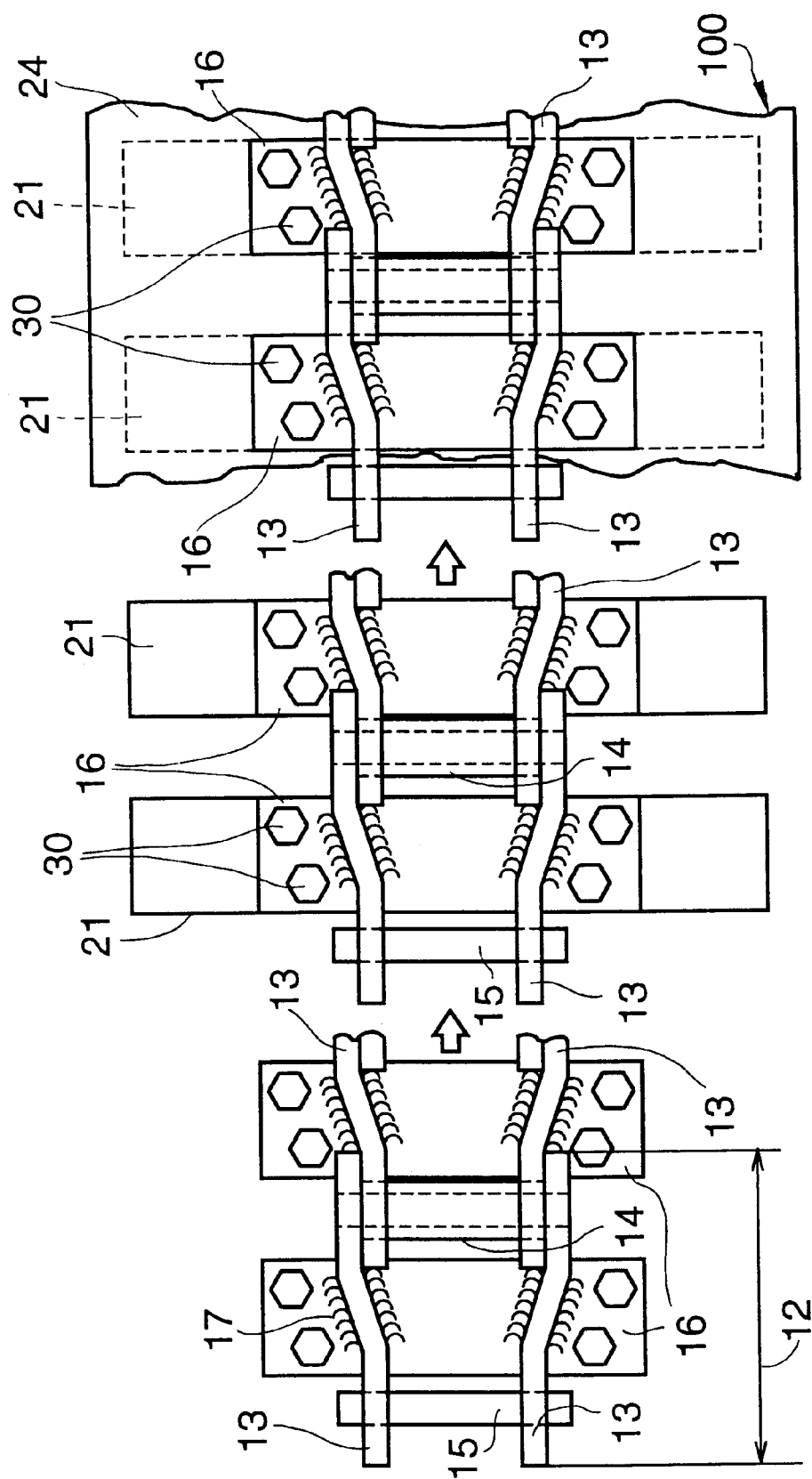
FIG. 9 is a side view illustrating a manufacturing method of the endless track shown in a manufacturing order, according to the third embodiment of the present invention.

The third embodiment of the present invention is directed to an endless track having a plate and having no small thickness portion, and to a manufacturing method thereof, as illustrated in FIGS. 7–9.

Figure 10:
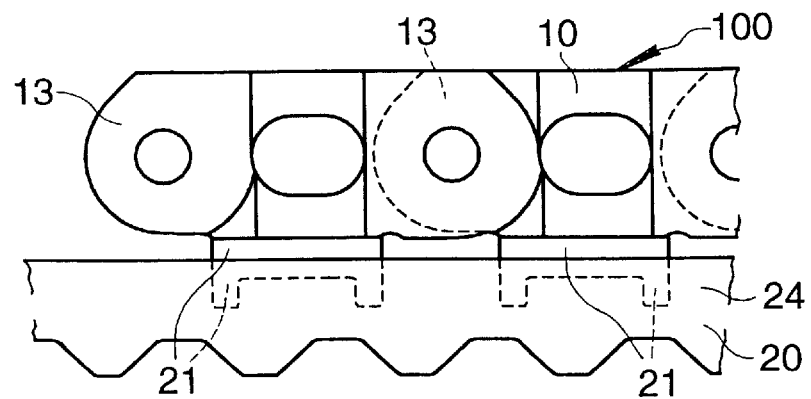
FIG. 10 is a partial side view of an endless track, according to a fourth embodiment of the present invention.
Figure 11:
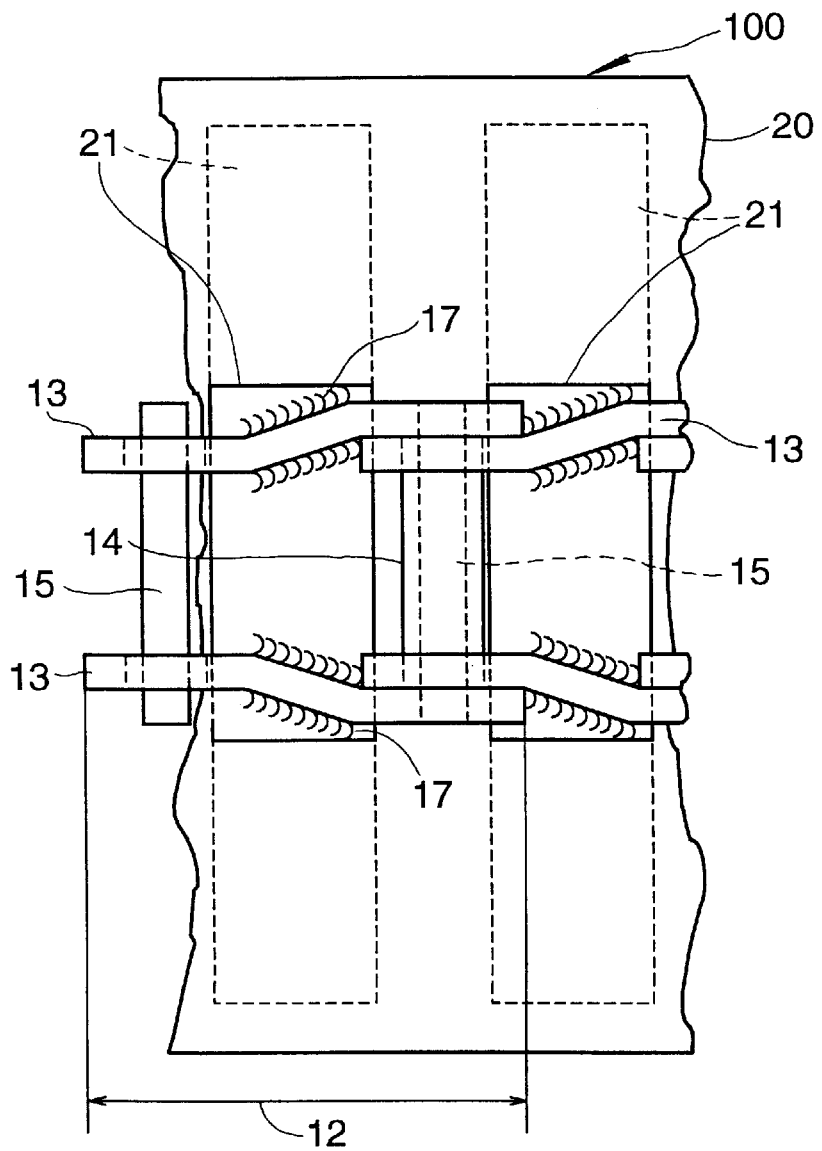
FIG. 11 is a partial plan view of the endless track, as viewed from a side opposite to a ground opposing surface, according to the fourth embodiment of the present invention.
Figure 12:
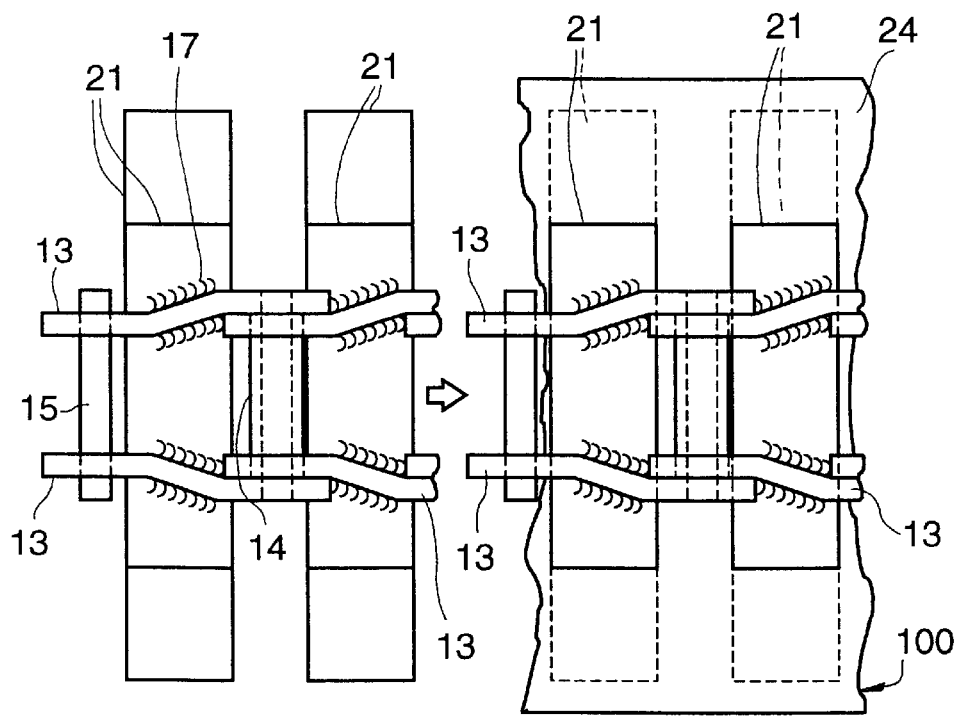
FIG. 12 is a side view illustrating a manufacturing method of the endless track shown in a manufacturing order, according to the fourth embodiment of the present invention.

The fourth embodiment of the present invention is directed to an endless track having no plate and having no small thickness portion, and to a manufacturing method thereof, as illustrated in FIGS. 10–12.

Figure 13:
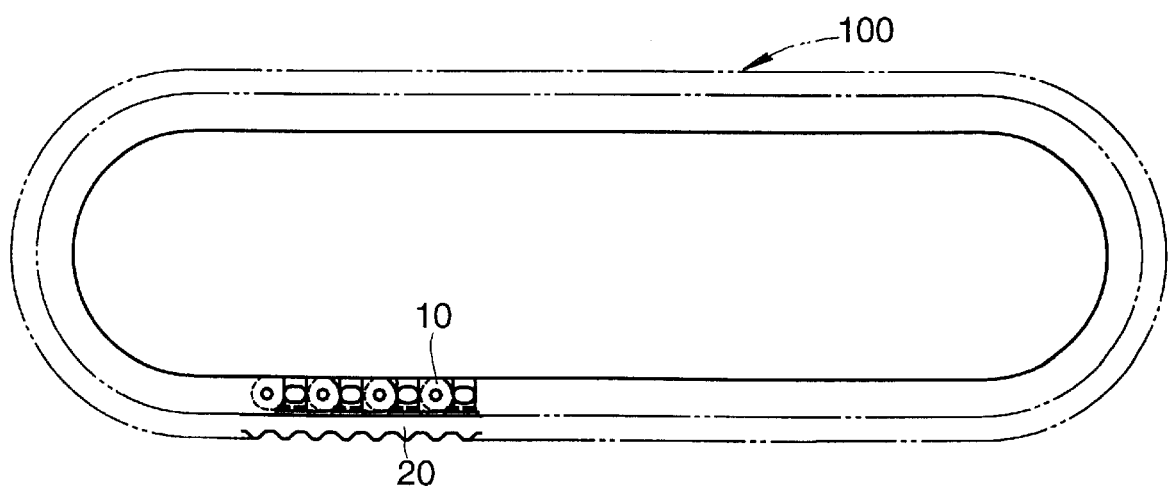
FIG. 13 is a side view of an endless track, applicable to any one of the embodiments of the present invention.
Figure 14:
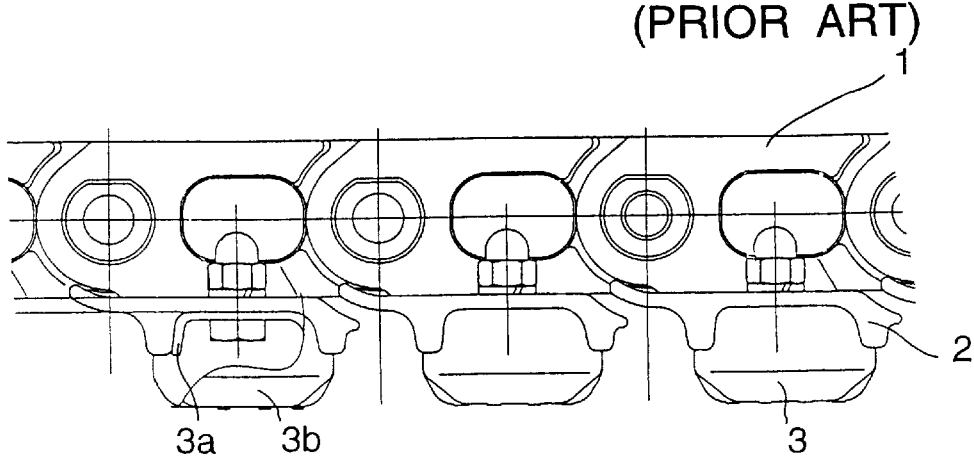
FIG. 14 is a partial side view of a conventional endless track of a rubber pad type A.
Figure 15:
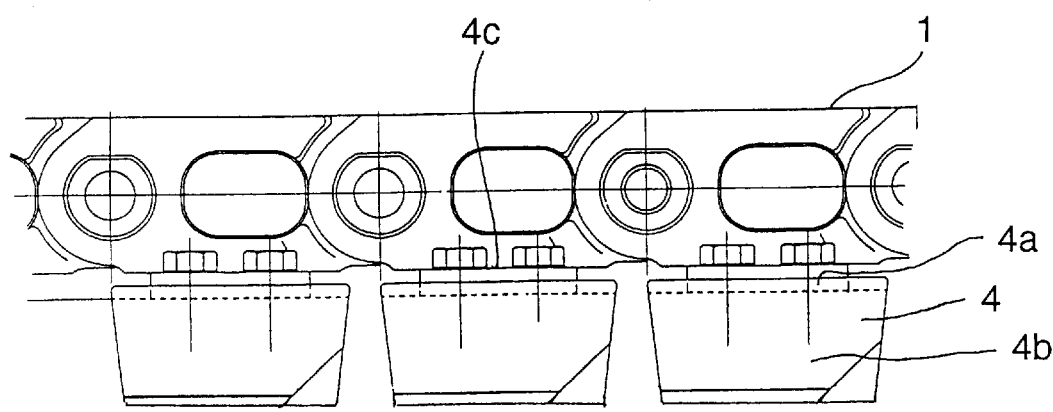
FIG. 15 is a partial side view a conventional endless track of a rubber pad type B.
Figure 16:
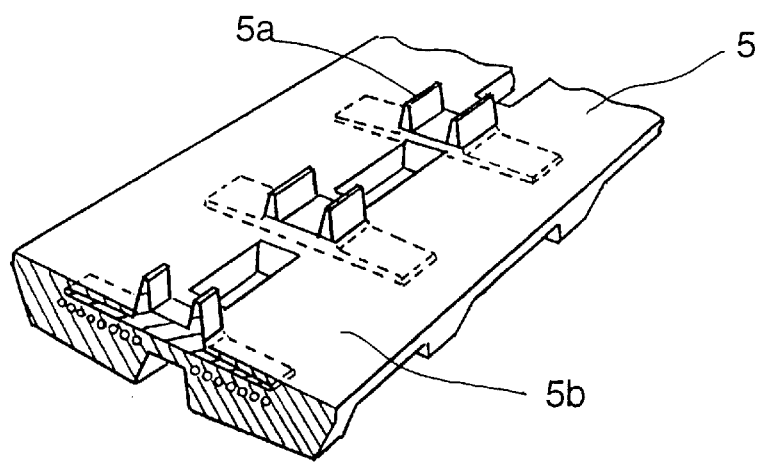
FIG. 16 is a partial perspective view of a conventional endless track of a rubber crawler type.

FIG. 13 illustrates an endless track applicable to any of the embodiments of the present invention.

Structural portions common to or similar to all of embodiments of the present invention are denoted with the same reference numerals throughout all of the embodiments of the present invention.

First, structures and effects common to or similar to all of the embodiments of the present invention will be explained with reference to FIGS. 1–3.

An endless track 100 includes an iron link belt 10, a continuous pad 20, and a connecting device 30.

The iron link belt 10 includes a link unit assembly 11 constructed of a plurality of link units 12 connected to each other. Each of the link units 12 includes a pair of links 13.

The plurality of link units 12 are connected to each other by pins 15 and bushings 14 to be formed into the link unit assembly 11.

The link 13 may be a link manufactured by bending a rolled steel plate (hereinafter, a bent plate link), or may be a link manufactured by forging (hereinafter, a forged link).

In the case of the bent plate link, an intermediate portion of the link 13 extends obliquely relative to opposite ends of the link 13.

The continuous pad 20 includes the same number of core metal plates 21 as that of the plurality of link units 12, and a single rubber belt 24. Each of the core metal plate 21 is fixed to each of the plurality of link units 12. The rubber belt 24 covers and is vulcanization-adhered to a ground opposing surface of each of the core metal plates 21 and extends continuously over all of the core metal plates 21. A slit 27 may be provided in an intermediate portion in a width direction of the rubber belt 24, which is a portion corresponding to a connected portion of adjacent links in a longitudinal direction of the rubber belt 24, so as to avoid interference with the link 13.

The connecting device 30 connects the iron link belt 10 and the continuous pad 20 at the link units 12 and the core metal plates 21.

The connecting device 30 includes either a bolt-and-nut 31, 32 or a welding. In a case where the connecting device 30 includes the bolt-and-nut 31, 32, either the bolt or the nut is fixed to the core metal plate 21 by welding and is covered with the rubber of the rubber belt 24.

The manufacturing method of the endless track 100 of the present invention includes: connecting a plurality of link units 12 each having a pair of links 13 thereby manufacturing the link unit assembly 11 of the iron link belt 10; and providing the same number of core metal plates 21 as that of the plurality of link units 12 of the iron link belt 10 and forming the single rubber belt 24 continuously extending over all of the core metal plates 21 such that the single rubber belt 24 covers and is vulcanization-adhered to the ground opposing surface of each of the core metal plates 21, thereby manufacturing a continuous pad 20.

Each of the pair of links 13 is manufactured by bending or forging.

Effects of the endless track 100 and the manufacturing method thereof according to the present invention will be explained below.

Since the vulcanization-forming of the single rubber belt 24 to which a series of core metal plates 21 is embedded is performed simultaneously, the productivity is greatly improved as compared with the conventional endless tracks of the rubber pad type A and the rubber pad type B in which vulcanization-adhesion of the rubber to each of the core metal plates is performed as many times as the number of the rubber pads.

Further, since the series of core metal plates 21 is embedded to the single rubber belt 24, the number of members required is smaller than that of the conventional endless tracks of the rubber pad type A and the rubber pad type B in which a plurality of rubber pads (core metal plates with rubber) need to be manufactured.

As discussed above, since the productivity improves by performing vulcanization-forming of the rubber belt 24 simultaneously and the number of members is reduced, the manufacturing cost of the endless track is reduced to nearly the same level as that of the conventional rubber crawler type.

Further, since the iron link belt 10 bears the tensile force of the endless track, the durability problem with the conventional endless track of rubber crawler type is completely eliminated. Thus, durability substantially the same as the conventional endless tracks of the rubber pad type A and rubber pad type B can be obtained.

Next, structures and effects unique to each embodiment of the present invention will be explained.

In the endless track 100 and the manufacturing method thereof according to the first embodiment of the present invention, as illustrated in FIGS. 1–3, the iron link belt 10 includes a plate 16, and the rubber belt 24 includes a small thickness portion 25.

More particularly, the iron link belt 10 includes the link unit assembly 11 and the plates 16. Each of the plates 16 is fixed to the pair of links 13 of each of the link units 12 of the link unit assembly 11 by welding 17. The plate 16 is constructed of a rectangular steel plate extending perpendicularly to a direction in which the link unit assembly 11 extends. The number of the plates 16 is the same as that of the link units 12. Two bolt-holes 18 are respectively formed on each side of the plate 16 located outside the pair of the link 13. A mud hole (mud-ejection hole) 19 may be formed in the central portion of the plate 16. The mud hole 19 may not necessarily be formed therein.

The continuous pad 20 includes the core metal plates 21 and the rubber belt 24. Each of the core metal plate 21 is constructed of a steel plate and is fixed to each of the plates 16 of the iron link belt 10. The number of the core metal plates 21 is the same as that of the plates 16. Each of the core metal plates 21 includes bolt-holes 22 disposed in positions corresponding to the bolt-holes 18 of the plate 16. A mud hole 23 may be formed in the central portion of the core metal plate 21. The mud hole 23 may not necessarily be formed therein.

The rubber belt 24 is constructed of a single rubber belt and extends continuously over all of the core metal plates 21 of the same number as that of the plates 16. The rubber belt 24 includes the small thickness portion 25 positioned between two adjacent core metal plates of the core metal plates 21. The small thickness portion 25 constitutes a part of the rubber belt 24. The small thickness portion 25 includes no core metal plate 21, and the thickness of the continuous pad 20 at the small thickness portion is thinner than that at a portion provided with the core metal plate and having a normal thickness. Preferably, the thickness of the rubber belt 24 at the small thickness portion is less than one third of that at the normal thickness portion, and is, more preferably, less than one fourth thereof. When the small thickness portion of the endless track 100 reaches a straight portion, the small thickness portion 25 may be curved or loosened perpendicularly to a direction in which the rubber belt 24 extends. A surface of the core metal plate 21 opposed to the plate 16 is exposed from the rubber belt 24 and the core plate 21 thus can contact the plate 16 directly. A mud hole 26 may be disposed in the rubber belt 24 at a portion corresponding to the mud hole 23 of the core metal plate 21. The mud hole 26 may not necessarily be formed therein. Preferably, a slit 27 is provided in an intermediate portion in a width direction of the rubber belt 24, which is a portion corresponding to a connected portion of adjacent links in a longitudinal direction of the rubber belt 24, so as to avoid interference with the link 13.

The reason for disposing the small thickness portion 25 will be explained. In the state where the endless track 100 is mounted on the construction vehicle, the length of the iron link belt and the rubber belt equals each other when the endless track 100 is at a straight portion. The length of the rubber belt becomes longer than that of the iron link belt in proportion to a radial distance from a rotational center when the endless track 100 is positioned around the sprocket. In order to smoothly absorb the length differential, the small thickness portion is disposed to allow the rubber belt 24 to be easily extended. In a case where the small thickness portion 25 has a loosened portion when the endless track 100 is at a straight portion, the loosened portion is deformed to extend when the track 10 reaches the sprocket, so that the length differential between the iron link belt and the rubber belt can be absorbed more easily.

The connecting device 30 is a means for connecting the iron link belt 10 and the continuous pad 20 at the plate 16 and the core metal plate 21. The connecting device 30 includes a bolt 31 and a nut 32. Either the bolt 31 or the nut 32 (the bolt 31 is shown as the connecting device 30 in the drawings) is welded to the core metal plate 21 before vulcanization-forming of the rubber belt 24, and is covered with rubber at the time of vulcanization- forming.

The manufacturing method of the endless track according to the first embodiment of the present invention includes: manufacturing the iron link belt 10, manufacturing the continuous pad 20, and connecting the iron link belt 10 and the continuous pad 20. Either manufacturing the iron link belt 10 or manufacturing the continuous pad 20 may be conducted earlier.

During the manufacturing of the iron link belt 10, the plate 16 extending perpendicularly to a direction in which the link unit assembly 11 extends is welded to the pair of link units 13 of each of the link units 12 of the link unit assembly 11.

During the manufacturing of the continuous pad 20, the rubber belt 24 is vulcanization-formed before the core metal plates 21 are fixed to the link units 12. When the rubber belt 24 is vulcanization-formed, the small thickness portion 25 is formed between two adjacent core metal plates of the core metal plates 21 of the rubber belt 24.

After manufacturing the continuous pad 20, the iron link belt 10 and the continuous pad 20 are connected to each other by the connecting device 30 at the plates 16 and the core metal plates 21.

The connecting device 30 includes the bolt 31 and the nut 32. Either the bolt 31 or the nut 32 (the bolt 31 is shown as the connecting device 30 in the drawings) is welded to the core metal plates 21 before vulcanization-forming of the rubber belt 24 and is covered with rubber of the rubber belt 24 during vulcanization-forming of the rubber belt 24. When connecting the iron link belt 10 and the continuous pad 20, the bolt 31 is inserted through the bolthole 18 and is threaded with the nut 32 thereby fixing the plate 16 and the core metal plate 21.

With the effects of the endless track and the manufacturing method thereof according to the first embodiment of the present invention, since the continuous pad 20 includes the small thickness portion 25, the length differential between the continuous pad 20 and the iron link belt 10 can be smoothly absorbed when the endless track 100 moves from a straight portion of the construction vehicle to a semicircular portion around the sprocket. As a result, the tensile deformation and the tensile stress are not generated in the rubber belt 24, which ensures good durability. Further, since the plate 16 is welded to the pair of links 13 and the plate 16 and the core metal plate 21 are connected by the connecting device 30, the iron link belt 10 and the continuous pad 20 can be manufactured independently of each other. Therefore, either manufacturing the iron link belt 10 or manufacturing the continuous pad 20 may be manufactured earlier, resulting in a high degree of freedom in manufacturing processes.

In the endless track 100 and the manufacturing method thereof according to the second embodiment of the present invention, as illustrated in FIGS. 4–6, the iron link belt 10 includes no plate 16, and the rubber belt 24 includes the small thickness portion 25.

More particularly, the pair of links 13 of each of the link units 12 of the link unit assembly 11 of the iron link belt 10 is fixed to each of the core metal plates 21 of the continuous pad 20 by a welding 17.

The continuous pad 20 includes the core metal plates 21 and the rubber belt 24. Each of the core metal plates 21 is constructed of a rectangular plate extending perpendicularly to a direction in which the link unit assembly 11 extends. The number of the core metal plates 21 is the same as that of the link units 12. A mud hole 23 may be formed in the central portion of the core metal plate 21. The mud hole 23 may not necessarily be formed therein.

The rubber belt 24 is continuous over all of the core metal plates 21 of the same number as that of the link units 12. The rubber belt 24 includes the small thickness portion 25 positioned between two adjacent core metal plates of the core metal plates 21. The small thickness portion 25 constitutes a part of the rubber belt 24. The small thickness portion 25 includes no core metal plate 21 and the thickness of the continuous pad 20 at the small thickness portion 25 is thinner than that at the normal thickness portion provided with the core metal plate 21.

Preferably, the thickness of the rubber belt 24 at the small thickness portion is less than one third of that at the normal thickness portion, and is, more preferably, less than one fourth thereof. When the small thickness portion 25 of the endless track 100 reaches a straight portion, the small thickness portion 25 may be curved or loosened perpendicularly to a direction in which the rubber belt 24 extends. A surface of the core metal plate 21 opposed to the link unit 12 is exposed from the rubber belt 24. Thus, the core plate 21 directly contacts the link 13 and is welded thereto. The mud hole 26 may be disposed in the rubber belt 24 at a portion corresponding to the mud hole 23 of the core metal plate 21. The mud hole 26 may not necessarily be formed therein.

The reason for disposing the small thickness portion 25 will be explained. In the state where the endless track 10 is mounted on the construction vehicle, the length of the iron link belt and that of the rubber belt equals each other while the endless track 100 is positioned at a straight portion, the length of the rubber belt becomes longer than that of the iron link belt in proportion to a radial distance from a rotational center when the endless track 100 is positioned around the sprocket. The rubber belt 24 is easily extended at the small thickness portion 25 to allow the length differential to be smoothly absorbed.

The manufacturing method of the endless track according to the second embodiment of the present invention includes: manufacturing the iron link belt 10; manufacturing the continuous pad 20; and connecting the iron link belt 10 and the continuous pad 20.

During the manufacturing of the iron link belt 10, the core metal plate 21 of the continuous pad 20 is welded to the pair of links 13 of each of the link units 12 of the link unit assembly 11.

During the manufacturing of the continuous pad 20, the rubber belt 24 is vulcanization-formed. When the rubber belt 24 is vulcanization-formed, the small thickness portion 25 is formed between two adjacent core metal plates of the core metal plates 21 of the rubber belt 24.

With the effects of the endless track and the manufacturing method thereof according to the second embodiment of the present invention, since the continuous pad 20 includes the small thickness portion 25, the length differential between the continuous pad 20 and the iron link belt 10 can be smoothly absorbed when the endless track 100 moves from the straight portion of the construction vehicle to a semi-circular portion around the sprocket. As a result, the tensile deformation and the tensile stress are not generated in the rubber belt 24, which ensures good durability. Further, since the core metal plate 21 is welded to the pair of links 13, the plate 16 of the iron link unit 10 can be removed, which leads to the reduction in the number of members and in the manufacturing cost.

In the endless track 100 and the manufacturing method thereof according to the third embodiment of the present invention, as illustrated in FIGS. 7–9, the iron link belt 10 includes a plate 16, and the rubber belt 24 includes no small thickness portion 25.

More particularly, the iron link unit 10 includes the link unit assembly 11 and the plates 16. Each of the plates 16 is fixed to the pair of links 13 of each of the link units 12 of the link unit assembly 11 of the iron link belt 10 by the welding 17. The plate 16 is constructed of a rectangular steel plate extending perpendicularly to a direction in which the link unit assembly 11 extends. The number of the plates 16 is the same as that of the link units 12. Two boltholes 18 are respectively formed on each side of the plate 16 located outside the pair of links 13. A mud hole 19 may be formed in the central portion of the plate 16. The mud hole 19 may not necessarily be formed therein.

The rubber belt 24 is constructed of a single rubber belt and is continuous over all of the core metal plates 21 of the same number as that of the plates 16. The rubber belt 24 includes no small thickness portion 25, which means that the rubber belt 24 has the normal thickness portion between adjacent core metal plates 21. A surface of the core metal plate 21 opposed to the plate 16 is exposed from the rubber belt 24, and the core plate 21 thus directly contacts the plate 16. The mud hole 26 may be disposed in the rubber belt 24 at a portion corresponding to the mud hole 23 of the core metal plate 21. The mud hole 26 may not necessarily be formed therein.

The connecting device 30 is a means for connecting the iron link belt 10 and the continuous pad 20 at the plates 16 and the core metal plates 21 and includes the bolt 31 and the nut 32. Either the bolt 31 or the nut 32 (the bolt 31 is shown as the connecting device 30 in the drawings) is welded to the core metal plate 21 before the rubber belt 24 is vulcanization-formed, and is covered with rubber at the time of vulcanization-forming the rubber belt 24.

In the manufacturing method of the endless track according to the third embodiment of the present invention, during manufacturing the iron link belt 10, the plate 16 extending perpendicularly to a direction in which the link unit assembly 11 extends is welded to the pair of link units 13 of each of the plurality of link units 12 of the link unit assembly 11. Before manufacturing the continuous pad 20, each of the core metal plate 21 is fixed to each of the plates 16 of each of the link units 12 of the link unit assembly 12. During the manufacturing of the continuous pad 20, the rubber belt 24 is vulcanization-formed such that the rubber belt 24 covers each of the core metal plates 21 and such that no small thickness portion 25 is formed in the rubber belt 24 between two adjacent core metal plates of the core metal plates 21 when the rubber belt is vulcanization-formed.

The plate 16 and the core metal plates are connected to each other by the connecting device 30. The connecting device 30 includes the bolt 31, which is inserted into the bolthole formed in the core metal plate 21.

With the effects of the endless track and the manufacturing method thereof according to the third embodiment of the present invention, since the rubber belt 24 includes no small thickness portion 25, when the rubber belt 24 reaches the sprocket of the construction vehicle, a greater force is required for causing the rubber belt 24 to extend between adjacent core metal plates 21 than in the first and the second embodiments of the present invention.

After the rubber belt 24 is vulcanization-formed such that the rubber belt extends continuously over all of the core metal plates 21, the rubber belt 24 may be divided or cut between two adjacent core metal plates of the core metal plates 21 into a plurality of separate pads. In such a case, the manufacturing efficiency obtained by continuously forming the rubber belt 24 over all of the core metal plates 21 can be improved, as compared with the conventional endless track in which the rubber pad is vulcanization-formed per each of the core metal plates 21.

In the endless track 100 and the manufacturing method thereof according to the fourth embodiment of the present invention, the iron belt link 10 includes no plate 16, and the rubber belt 24 includes no small thickness portion 25.

More particularly, the pair of link units 13 of each of the plurality of link units 12 of the link unit assembly 11 is fixed to each of the core metal plates 21 of the continuous pad 20 by the welding 17.

The continuous pad 20 includes the core metal plates 21 and the rubber belt 24. Each of the core metal plates 21 is constructed of a rectangular steel plate extending perpendicularly to the direction in which the link unit assembly 11 extends. The number of the core metal plates 21 is the same as that of the link units 12. The mud hole 23 may be formed in the central portion of the core metal plate 23. The mud hole 23 may not necessarily be formed therein.

The rubber belt 24 is constructed of a single rubber belt and is continuous over all of the core metal plates 21. The rubber belt 24 includes no small thickness portion 25, which means that the rubber belt 24 has the normal thickness portion. A surface of the core metal plate 21 opposed to the link unit 12 is exposed from the rubber belt 24, and the core metal plate 21 is directly welded to the link 13. The mud hole 26 may be formed in the rubber belt 24 at a portion corresponding to the mud hold 23 of the core metal plate 21. The mud hole 26 may not necessarily be formed therein.

The manufacturing method according to the fourth embodiment of the present includes manufacturing the iron link belt 10, and manufacturing the continuous pad 20.

During the manufacturing of the iron link belt 10, each of the core metal plates 21 is welded to the pair of links 13 of each of the plurality of link units 12 of the link unit assembly 11.

During the manufacturing of the continuous pad 20, the rubber belt 24 is vulcanization-formed. At the time of vulcanization-forming, the small thickness portion 25 is not formed in the rubber belt 24.

With the endless track and the manufacturing method thereof according to the fourth embodiment of the present invention, since the rubber belt 24 includes no small thickness portion 25, when the rubber belt 24 reaches the sprocket of the construction vehicle, a greater force is required for causing the rubber belt 24 to extend between adjacent core metal plates 21 than the first and the second embodiments of the present invention.

After the rubber belt 24 is vulcanization-formed such that the rubber belt extends continuously over all of the core metal plates 21, the rubber belt 24 may be divided or cut between two adjacent core metal plates of the core metal plates 21 into a plurality of separate pads. In that case, the manufacturing efficiency obtained by continuously forming the rubber belt 24 over all of the core metal plates 21 can be improved, as compared with the conventional endless track in which the rubber pad is vulcanization-formed per each of the core metal plates 21.

According to the present invention, the following technical advantages can be obtained:

Since the vulcanization-forming of the single rubber belt to which a series of core metal plates is embedded is performed simultaneously, the productivity is greatly improved as compared with the conventional endless tracks of the rubber pad type A and the rubber pad type B in which vulcanization-adhesion of rubber to each of core plates is conducted as many times as the number of the rubber pads.

Further, since a series of core metal plates is embedded to the single rubber belt, the number of members required is smaller than that of the conventional endless tracks of the rubber pad type A and the rubber pad type B in which a plurality of rubber pads (core metal plates with rubber) need to be manufactured.

As discussed above, since the productivity improves by performing vulcanization-forming of the rubber belt simultaneously and the number of members is reduced, the manufacturing cost of the endless track is reduced to nearly the same level as that of the conventional endless track of the rubber crawler type.

Further, since the iron link belt bears the tensile force of the endless track, the durability problem with the conventional endless track of the rubber crawler type is completely eliminated. Thus, durability substantially the same as the conventional endless tracks of the rubber pad type A and the rubber pad type B can be obtained.

The foregoing description of the embodiments of the present invention provides illustration and description, but is not intended to be exhaustive or to limit the invention to the precise form disclosed. Modifications and variations are possible consistent with the above teachings or may be acquired from practice of the invention. For example, the various features of the invention, which are described in the contexts of separate embodiments for the purposes of clarity, may also be combined in a single embodiment. Conversely, the various features of the invention which are, for brevity, described in the context of a single embodiment may also be provided separately or in any suitable sub-combination. Accordingly, it will be appreciated by persons skilled in the art that the present invention is not limited to what has been particularly shown and described hereinabove. Rather, the scope of the present invention is defined only by the attached claims and their equivalents.

What is claimed is:

1. An endless track comprising:
    an iron link belt including a link unit assembly constructed of a plurality of link units connected to each other, each link unit including a pair of links;
    a continuous pad including the same number of core metal plates as that of said plurality of link units and a single rubber belt, each of said core metal plates being fixed to each of said plurality of link units, said rubber belt covering and being vulcanization-adhered to a ground opposing surface of each of said core metal plates, said rubber belt being continuous over all of said core metal plates; and
    a connecting device for connecting said iron link belt and said continuous pad at said link units and said core metal plates.

2. An endless track according to claim 1, wherein each of said pair of links comprises at least one of a bent plate link and a forged link.

3. An endless track according to claim 1, wherein said connecting device comprises at least one of a bolt-and-nut and a welding.

4. An endless track according to claim 3, wherein said connecting device comprises said bolt-and-nut, and said bolt-and-nut is welded to said core metal plate and is covered with rubber of said rubber belt.

5. An endless track according to claim 1, wherein said iron link belt includes the same number of plates as that of said plurality of link units,
    each of said plates being welded to said pair of links of each of said plurality of link units of said link unit assembly and extending perpendicularly to a direction in which said link unit assembly extends, each of said core metal plates of said continuous pad being fixed to each of said plates of said iron link belt, said rubber belt of said continuous pad including a small thickness portion positioned between two adjacent core metal plates of said core metal plates, said iron link belt and said continuous pad being connected to each other by said connecting device at said plates and said core metal plates.

6. An endless track according to claim 1, wherein each of said core metal plates of said continuous pad extends perpendicularly to a direction in which said link unit assembly extends and is directly welded to said pair of links of each of said plurality of link units of said link unit assembly, said rubber belt of said continuous pad including a small thickness portion between positioned two adjacent core metal plates of said core metal plates.

7. An endless track according to claim 1, wherein said iron link belt includes the same number of plates as that of said plurality of link units, each of said plates being welded to said pair of links of each of said plurality of link units of said link unit assembly and extending perpendicularly to a direction in which said link unit assembly extends, each of said core metal plates of said continuous pad being fixed to each of said plates of said iron link belt, said rubber belt of said continuous pad including a normal thickness portion positioned between two adjacent core metal plates of said core metal plates, said iron link belt and said continuous pad being connected to each other by said connecting device at said plates and said core metal plates.

8. An endless track according to claim 1, wherein each of said core metal plates of said continuous pad extends perpendicularly to a direction in which said link unit assembly extends and is directly welded to said pair of links of each of said plurality of link units of said link unit assembly, said rubber belt of said continuous pad including a normal thickness portion positioned between two adjacent core metal plates of said core metal plates.

9. A method for manufacturing an endless track comprising:

connecting a plurality of link units each having a pair of links thereby manufacturing a link unit assembly of an iron link belt; and providing the same number of core metal plates as that of said plurality of link units of said iron link belt and forming a single rubber belt continuously extending over all of said core metal plates such that said single rubber belt covers and is vulcanization-adhered to a ground opposing surface of each of said core metal plates, thereby manufacturing a continuous pad.

10. A method according to claim 9, wherein each link of said pair of links is manufactured through at least one of a bending and forging process.

11. A method according to claim 9, wherein during said manufacturing of an iron link belt, a plate extending perpendicularly to a direction in which said link unit assembly extends is welded to said pair of links of each of said plurality of link units of said link unit assembly, and during said manufacturing of a continuous pad, before said core metal plates are fixed to said plurality of link units, a small thickness portion is formed between two adjacent core metal plates of said core metal plates when said rubber belt is vulcanization-formed, and after manufacturing said continuous pad, said iron link belt and said continuous pad are connected to each other by a connecting device at said plates and said core metal plates.

12. A method according to claim 11, wherein said connecting device includes a bolt and a nut, and before said vulcanization-forming of a rubber belt, at least one of said bolt and said nut is welded to each of said core metal plate, and during said vulcanization-forming of a rubber belt, at least one of said bolt and said nut is covered with a rubber of said rubber belt.

13. A method according to claim 9, wherein each of said core metal plates extending perpendicularly to a direction in which said link unit assembly extends is directly welded to said pair of links of each of said plurality of link units of said link unit assembly of said iron link belt, and during manufacturing of said continuous pad, when said rubber belt is vulcanization-formed, a small thickness portion is formed to said rubber belt between two adjacent core metal plates of said core metal plates.

14. A method according to claim 9, wherein during said manufacturing an iron link belt, a plate extending perpendicularly to a direction in which said link unit assembly extends is welded to said pair of links of each of said plurality of link units of said link unit assembly, and before said manufacturing of a continuous pad, each of said core metal plates is fixed to said plate of each of said link units of said iron link belt, and during said manufacturing of a continuous pad, said rubber belt is vulcanization-formed such that said rubber belt covers each of said core metal plates and such that a normal thickness portion is formed to said rubber belt between two adjacent core metal plates of said core metal plates when said rubber belt is vulcanization-formed.

15. A method according to claim 9, wherein each of said core metal plates extending perpendicularly to a direction in which said link unit assembly extends is directly welded to said pair of links of each of said plurality of link units of said link unit assembly of said iron link belt, and during said manufacturing of a continuous pad, a normal thickness portion is formed to said rubber belt between two adjacent core metal plates of said core metal plates when said rubber belt is vulcanization-formed.

16. A method according to any one of claims 14 or 15 further comprising dividing said rubber belt between two adjacent core metal plates of said core metal plates among a plurality of separate pads.

* * * * *